US012449799B2

(12) United States Patent
Ghazi et al.

(10) Patent No.: US 12,449,799 B2
(45) Date of Patent: Oct. 21, 2025

(54) ANOMALY DETECTION FOR EMBEDDED SYSTEMS

(71) Applicant: Robert Bosch GmbH, Stuttgart (DE)

(72) Inventors: Irtsam Ghazi, Pittsburgh, PA (US); Emily Ruppel, Pittsburgh, PA (US); Shruti Lall, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 112 days.

(21) Appl. No.: 18/503,981

(22) Filed: Nov. 7, 2023

(65) Prior Publication Data

US 2025/0076867 A1 Mar. 6, 2025

Related U.S. Application Data

(60) Provisional application No. 63/580,864, filed on Sep. 6, 2023.

(51) Int. Cl.
*G05B 23/02* (2006.01)
*G06F 8/61* (2018.01)
*G06F 11/30* (2006.01)

(52) U.S. Cl.
CPC ..... *G05B 23/0272* (2013.01); *G05B 23/0286* (2013.01); *G06F 8/61* (2013.01); *G06F 11/3013* (2013.01)

(58) Field of Classification Search
CPC ............ G05B 23/0272; G05B 23/0286; G06F 11/3013; G06F 11/0751; H04W 4/023; H04W 4/44
See application file for complete search history.

(56) References Cited

U.S. PATENT DOCUMENTS

| | | | |
|---|---|---|---|
| 9,668,073 B2 | 5/2017 | Das et al. | |
| 10,410,135 B2 | 9/2019 | Shumpert | |
| 10,715,941 B2 | 7/2020 | Das | |
| 2016/0062950 A1* | 3/2016 | Brodersen | G06F 18/2433 702/181 |
| 2017/0366935 A1* | 12/2017 | Ahmadzadeh | H04M 1/72457 |
| 2019/0294485 A1* | 9/2019 | Kukreja | G06F 11/0772 |
| 2020/0285997 A1* | 9/2020 | Bhattacharyya | G06N 7/01 |
| 2020/0366702 A1* | 11/2020 | Mahaffey | G06F 11/3051 |
| 2022/0066435 A1 | 3/2022 | Thimmanaik et al. | |
| 2022/0114044 A1 | 4/2022 | Singh | |

(Continued)

OTHER PUBLICATIONS

Robert Bosch GmbH, "SoundSee—Insight with Audio AI," <https://www.bosch.com/research/know-how/success-stories/audio-ai/> web page visited Aug. 28, 2023 (10 pages).

*Primary Examiner* — Mirza F Alam
(74) *Attorney, Agent, or Firm* — Michael Best & Friedrich LLP

(57) ABSTRACT

Systems and methods for anomaly detection in embedded systems. One example provides an anomaly detection system including a device configured to be connected to a server. The device includes an electronic processor and a memory. The memory stores a first application. The electronic processor is configured to transmit a request for an anomaly detection application. The anomaly detection application includes a set of instructions for detecting anomalies of the device. The electronic processor is configured to receive, from the server, the anomaly detection application, and replace the first application with the anomaly detection application within the memory.

17 Claims, 8 Drawing Sheets

(56) References Cited

U.S. PATENT DOCUMENTS

2022/0171995 A1    6/2022   Balasubramanian et al.
2023/0025238 A1    1/2023   Rudolph et al.
2023/0063601 A1    3/2023   Upadhyay

* cited by examiner

ANOMALY DETECTION FOR EMBEDDED SYSTEMS

This application claims the benefit of U.S. Provisional Patent Application No. 63/580,864, filed Sep. 6, 2023, the entire content of which is hereby incorporated by reference.

FIELD

Embodiments, examples, and aspects relate to, among other things, systems and methods for anomaly detection in embedded systems.

SUMMARY

An embedded system is a computer system that often combines hardware and software to perform one or more dedicated functions within a larger device or system. Embedded systems are common in many products. For example, embedded systems are used in various appliances, vehicles, consumer products, and other devices. Anomaly detection is implemented to diagnose failures and other performance issues of such devices. Some existing embedded systems include dedicated diagnostics devices that perform diagnostic tasks. In some instances, a diagnostic sensor that senses sound or audio, vibration, light, or other phenomena is used to detect possible failures. One example of a product that includes an embedded system is a video camera. Many video camera use motors and a gearbox to pan and tilt. A microphone may be implemented as a diagnostic sensor to pick up changes in environmental sound to identify whether the motor stalls or the gear box breaks down. As another example, an accelerometer may be used to sense motion in a conveyor system to detect pallets moving on the conveyor and detect additional undesired vibration.

However, the use of dedicated diagnostic devices add additional hardware within the system that may be expensive and take up space within a housing of the embedded system. Accordingly, examples, instances, and aspects described herein utilize existing hardware within embedded systems to perform diagnostic operations without the need for dedicated anomaly detection hardware. An orchestrator may be implemented on a server to distribute a set of instructions for anomaly detection (e.g., anomaly detection applications) to connected embedded systems. The embedded systems utilize a bytecode instruction format runtime to implement the anomaly detection application. When the anomaly detection application is received, the embedded system replaces an application implemented by the bytecode instruction format runtime during normal operation.

By dynamically loading anomaly detection, devices that normally perform other operations may also perform anomaly detection. Accordingly, examples described herein reduce reliance on dedicated hardware, provide system flexibility, and remove the need for permanent dedicated anomaly detection hardware within device memory.

One example provides an anomaly detection system that includes a device configured to be connected to a server. The device includes an electronic processor and a memory, the memory stores a first application. The electronic processor is configured to transmit a request for an anomaly detection application. The anomaly detection application includes a set of instructions for detecting anomalies of the device. The electronic processor is configured to receive, from the server, the anomaly detection application, and replace the first application with the anomaly detection application within the memory.

Another example provides a method for anomaly detection in embedded systems. The method includes transmitting, via an electronic processor of a device, a request for an anomaly detection application to an orchestrator in a server. The anomaly detection application includes a set of instructions for detecting anomalies of the device. The method includes receiving, via the electronic processor and from the server, the anomaly detection application. The method also includes, replacing, via the electronic processor, a first application stored in a memory with the anomaly detection application. The method also includes performing, via the electronic processor implementing the anomaly detection application, an anomaly detection operation.

Other features, aspects, and benefits of various embodiments will become apparent by consideration of the detailed description and accompanying drawings.

DETAILED DESCRIPTION

Figure 1:
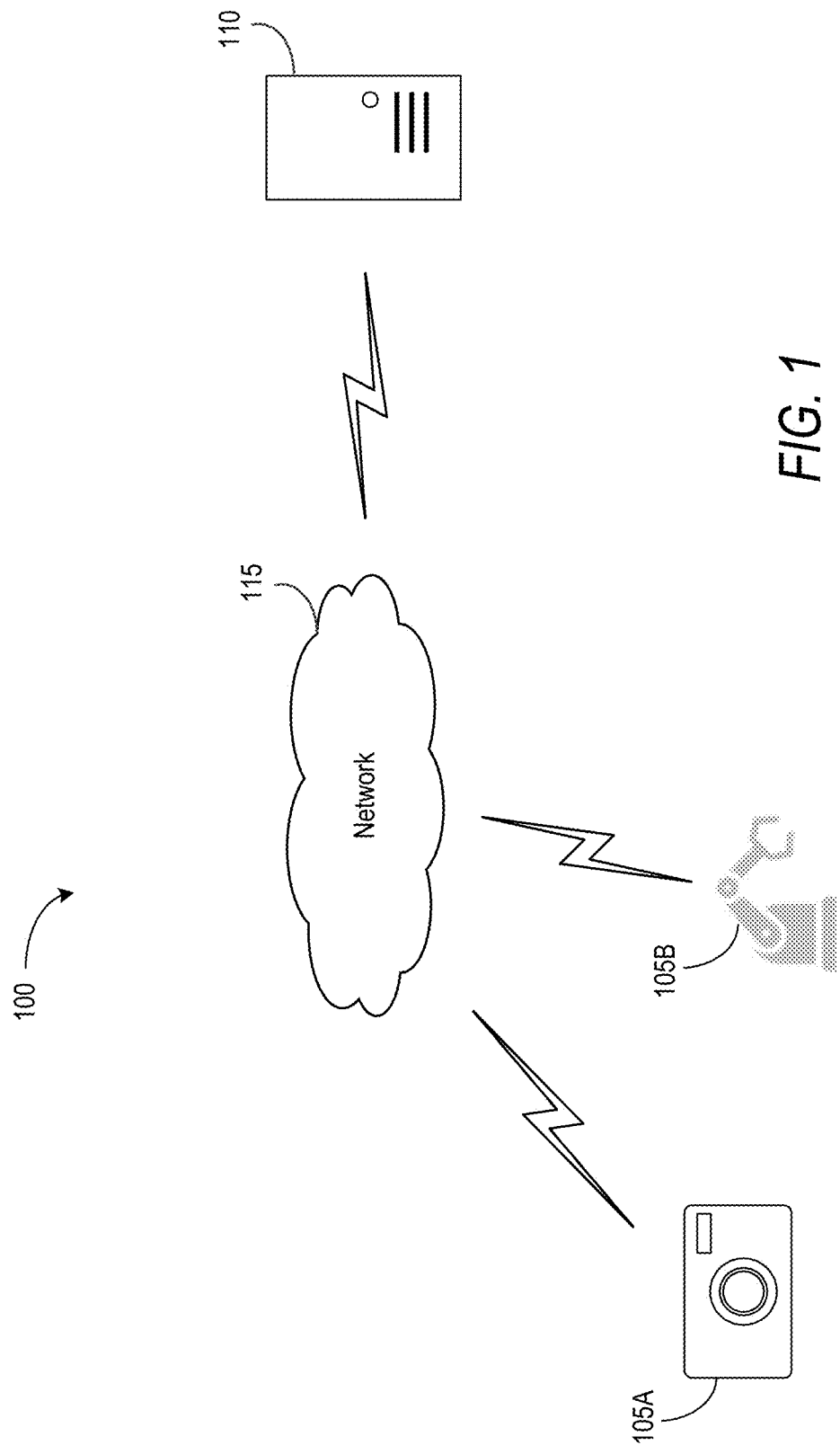
FIG. 1 illustrates a communication system including multiple embedded system devices according to one example.

One or more examples are described and illustrated in the following description and accompanying drawings. These examples are not limited to the specific details provided herein and may be modified in various ways. Other examples may exist that are not described herein. For example, a device or structure that is "configured" in a certain way is configured in at least that way but may also be configured in ways that are not listed.

Examples described herein may be implemented as non-transitory, computer-readable medium storing instructions executable by one or more electronic processors to perform the described functionality. As used in the present application, "non-transitory computer-readable medium" comprises all computer-readable media but does not include a transitory, propagating signal. Accordingly, non-transitory computer-readable medium may include, for example, a hard disk, a CD-ROM, an optical storage device, a magnetic storage device, ROM (Read Only Memory), RAM (Random Access Memory), register memory, a processor cache, other memory and storage devices, or combinations thereof.

For ease of description, some or all of the example systems presented herein are illustrated with a single exemplar of each of its component parts. Some examples may not describe or illustrate all components of the systems. Other instances may include more or fewer of each of the illustrated components, may combine some components, or may include additional or alternative components.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

FIG. 1 illustrates a communication system 100 (e.g., an anomaly detection system) for controlling embedded systems. Embedded systems are computer systems that combine hardware and software to perform one or more dedicated functions within a larger device or system. For example, the embedded system may include a controller having an electronic processor and memory, and a variety of sensors. For the sake of simplicity, embedded systems are henceforth referred to as devices. Particularly, devices as referred to herein are systems that include embedded systems as well as additional other components for performing dedicated function. Devices may be, for example, a dishwasher that includes a controller that controls one or more motors and water control mechanisms, a refrigerator that includes a controller that controls lights and a compressor, an air-conditioning unit that includes sensors for sensing a temperature and a controller for controlling the temperature using temperature control mechanisms (e.g., a compressor, a heat pump, etc.), and other devices such as washing machines, dryers, vehicles, planes, ships, etc.

In the example illustrated, the communication system 100 includes a first device 105A and a second device 105B that communicate with a server 110 over communication network 115. In the following description, when explaining how a single device functions, a reference to device 105 is used. It is not necessary, however, that the devices 105A and 105B are identical. In the example of FIG. 1, the first device 105A is a camera and the second device 105B is a mechanical arm. In some examples, the communication system 100 includes more or fewer devices 105 than the number shown in FIG. 1.

In one example, the server 110 is a computer or computer program which manages access to a centralized resource or service in a network. The server 110 includes applications, such as anomaly detection applications, that may be transmitted to devices 105 over the communication network 115, as described below in more detail. In some examples, the server 110 includes a display and a user interface capable of receiving a plurality of user inputs.

The communication network 115 may be wired, wireless, or a combination thereof. All or parts of the communication network 115 may be implemented using various existing networks, for example, a cellular network, a Long Term Evolution (LTE) network, a 5G network, the Internet, a Bluetooth™ network, a wireless local area network (for example, Wi-Fi), a public switched telephone network, and others. The communication network 115 may also include future developed networks. Also, in some embodiments, the communication network 115 includes a combination of networks. For example, the first device 105A may communicate over a LTE network, while the second device 105B may communicate over a Wi-Fi network.

Figure 2:
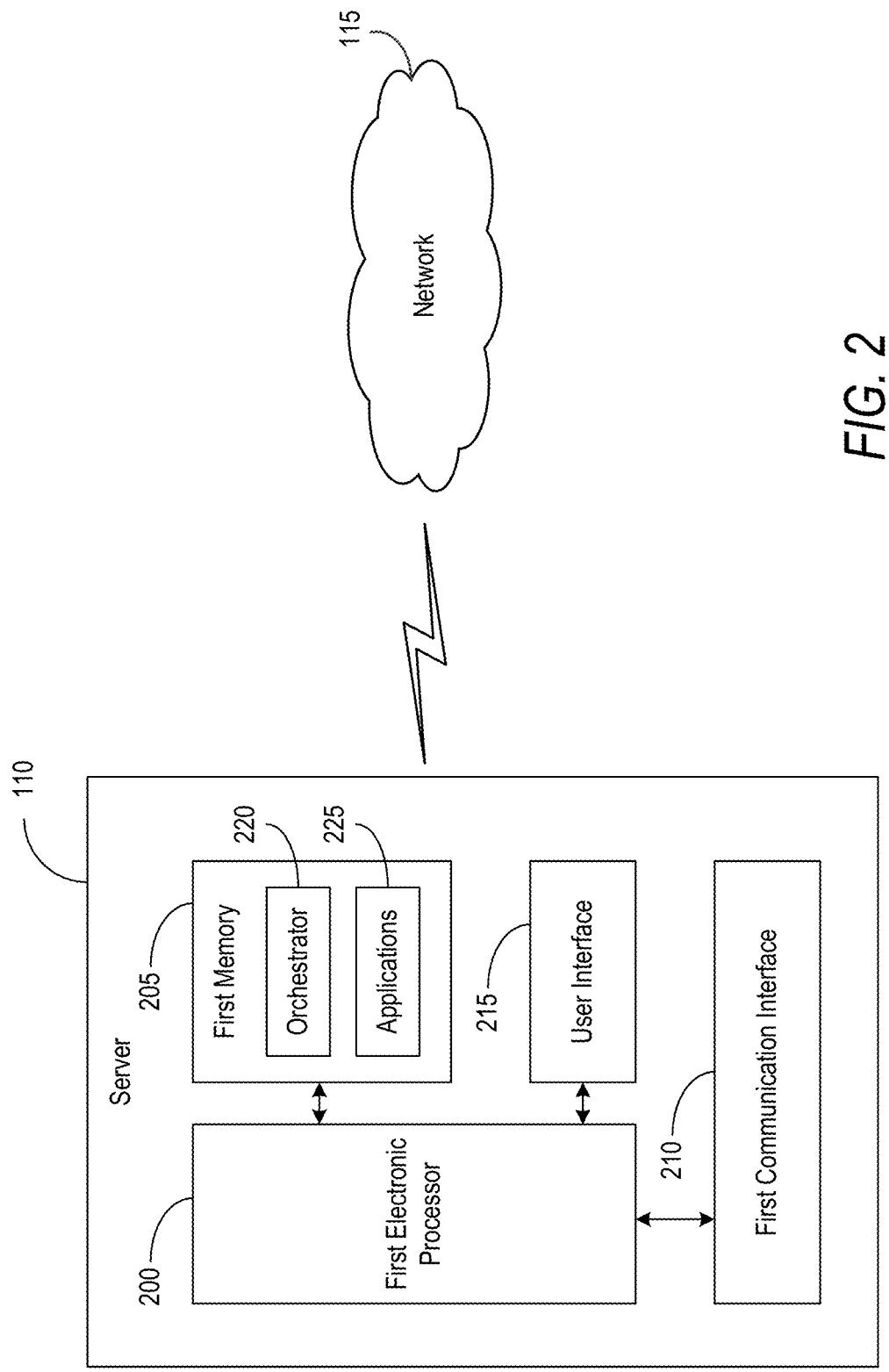
FIG. 2 is a block diagram of a server of the communication system of FIG. 1 according to one example.

FIG. 2 is a block diagram of an example server 110 of FIG. 1. The server 110 includes, among other things, a first electronic processor 200 (such as a programmable electronic microprocessor, microcontroller, or similar device), a first memory 205 (for example, a non-transitory, machine readable medium), a first communication interface 210, and a user interface 215. In some instances, the server 110 also includes a plurality of electrical and electronic components that provide power, operational control, and protection to the components and modules within the server 110. The first electronic processor 200, the first memory 205, the first communication interface 210, and the user interface 215, as well as the other various modules are connected by one or more control or data buses.

The first electronic processor 200 obtains and provides information (for example, from the first memory 205 and the first communication interface 210), and processes the information by executing one or more software instructions or modules capable of being stored, for example, in the first memory 205). The software can include firmware, one or more applications, program data, filters, rules, one or more program modules, and other executable instructions. In particular, the first electronic processor 200 executes instructions stored in the first memory 205 to perform the methods described herein. The first memory 205 can include one or more non-transitory computer-readable media and includes a program storage area and a data storage area. The program storage area and the data storage area can include combinations of different types of memory, for example, read-only memory ("ROM"), random access memory ("RAM"), electrically erasable programmable read-only memory ("EEPROM"), flash memory, or other suitable digital memory devices.

The first electronic processor 200 receives user inputs from the user interface 215 and may be used to receive inputs related to transmission of applications, such as a selection of an application to provide to the first device 105A or the second device 105B.

In some examples, the first memory 205 stores an orchestrator 220 and applications 225. The orchestrator 220 includes a set of instructions for configuring, coordinating, and managing the devices 105 and applications performed by the devices 105. For example, the orchestrator 220 is software that is aware of the capabilities and constraints of the devices 105 as well as the additional functional and deployment requirements of applications 225. When applications are deployed, the orchestrator 220 monitors the execution of the applications 225 through control messages from the respective device 105 and adapts deployment of applications 225 if necessary. Additionally, the orchestrator 220 contains instructions to aid in deciding the timing of deploying applications 225. The applications 225 may include, for example, anomaly detection applications. The applications 225 are described in more detail with respect to FIG. 3.

It should be understood that the functionalities of the server 110 may be spread over multiple devices and need not solely be performed within the server 110.

Figure 3:
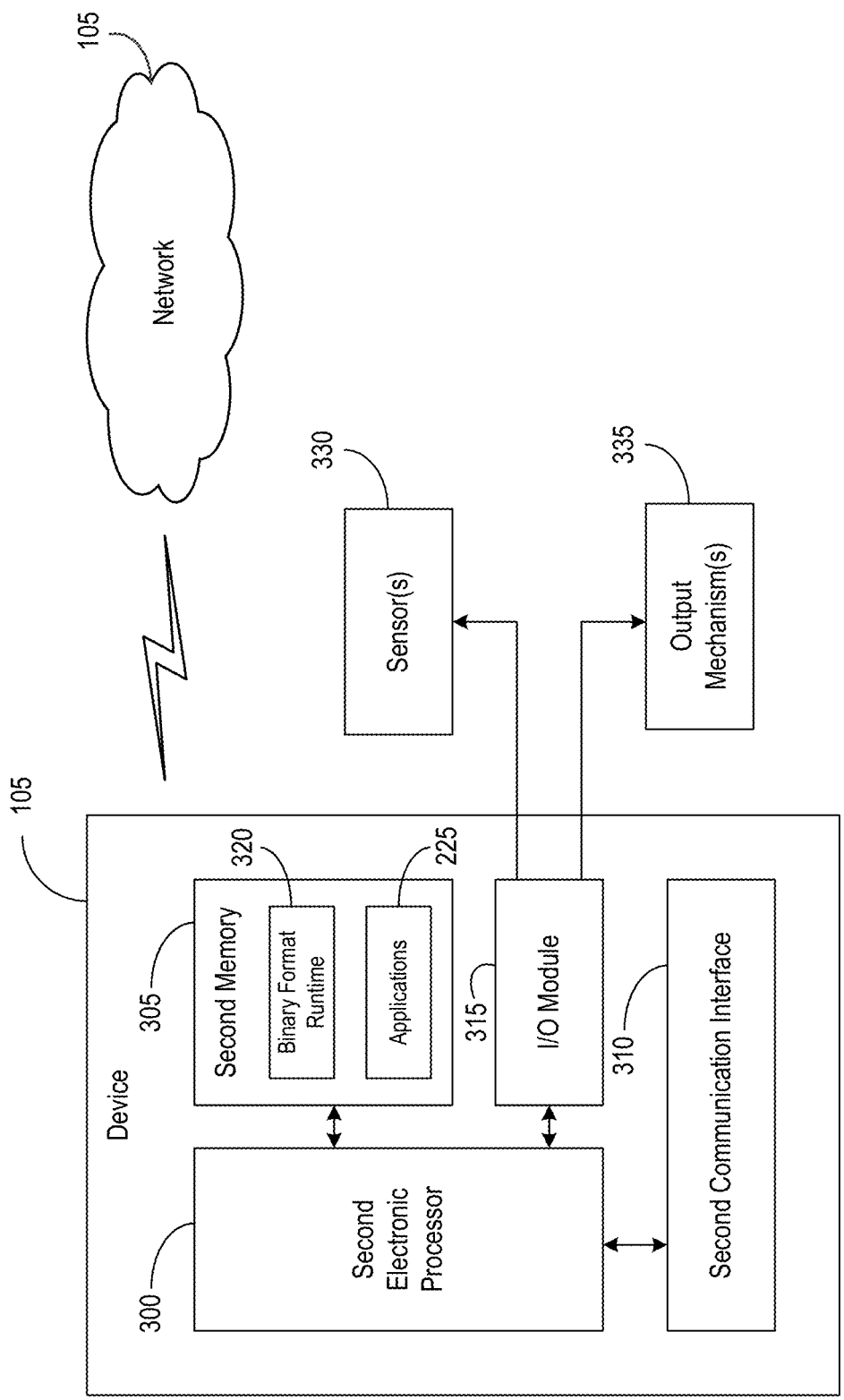
FIG. 3 is a block diagram of an embedded system device of FIG. 1 according to one example.

FIG. 3 is a block diagram of an example device 105 of FIG. 1. The device 105 includes, among other things, a second electronic processor 300 (e.g., a device electronic processor), a second memory 305, a second communication interface 310, and an input/output (I/O) module 315. In some instances, the device 105 also includes a plurality of electrical and electronic components that provide power, operational control, and protection to the components and modules within the device 105. The second electronic processor 300, the second memory 305, the second communication interface 310, and the I/O module 315, as well as the other various modules, are connected by one or more control or data buses. It should be understood that the second electronic processor 300, the second memory 305, and the second communication interface 310 include similar components to those described above with respect to the first electronic processor 200, the first memory 205, and the first communication interface 210, respectively, and perform similar functions but need not be identical.

In some instances, the device 105 includes a sensor 330 and an output mechanism 335. The sensor 330 provides inputs to the second electronic processor 300. The output mechanism 335 is controlled by the second electronic processor 300. The sensor 330 and the output mechanism 335 are connected to the second electronic processor 300 via the I/O module 315. While only a single sensor 330 and a single output mechanism 335 are illustrated, in some implementations, the device 105 includes additional sensors 330 and output mechanisms 335. The sensor 330 may be, for example, a microphone, an accelerometer, a motion sensor, a temperature sensor, a position sensor, a light sensor, a water sensor, a gas sensor, a proximity sensor, an infrared sensor, an ultrasonic sensor, or another suitable sensor for providing information to the second electronic processor 300. The output mechanism 335 may be, for example, a motor, an actuator, a gearbox, a light (for example, a light emitting diode), a screen, or some other controllable mechanism that provides an output.

The second memory 305 stores, among other things, a bytecode format runtime 320 (e.g., a bytecode instruction format runtime, a portable bytecode format runtime, etc.) and applications 225 (e.g., bytecode instruction modules). The second electronic processor 300 implements the bytecode format runtime 320 to perform operations indicated by the application 225. The bytecode format runtime 320 may be, for example, a WebAssembly™ runtime. Data sent in WebAssembly™ format may be performed on a variety of processing architectures, and are not limited to a particular hardware configuration.

As described herein, the applications 225 contain sets of instructions for performing particular operations. For example, the applications 225 may contain instructions for processing signals from the sensor 330 and for controlling the output mechanism 335. Accordingly, different applications 225 may be implemented by each device 105. For example, the first device 105A may include a first application 225, and the second device 105B may include a second application 225. Additionally, each device 105 may include multiple applications 225.

In some instances, the application 225 is an anomaly detection application. The anomaly detection application contains instructions for detecting anomalous values in data of the device 105, and therefore for detecting anomalies in the performance of the device 105. In some implementations, the application 225 is a machine-learning model pre-trained to identify anomalies associated with the device 105. The machine-learning model may be a supervised model, such as an autoencoder, a variational autoencoder, a recurrent neural network, or the like. Alternatively, the machine-learning model may be an unsupervised model such as a K-means clustering model, a Gaussian mixture model, a local outlier detection model, or the like.

Figure 4:
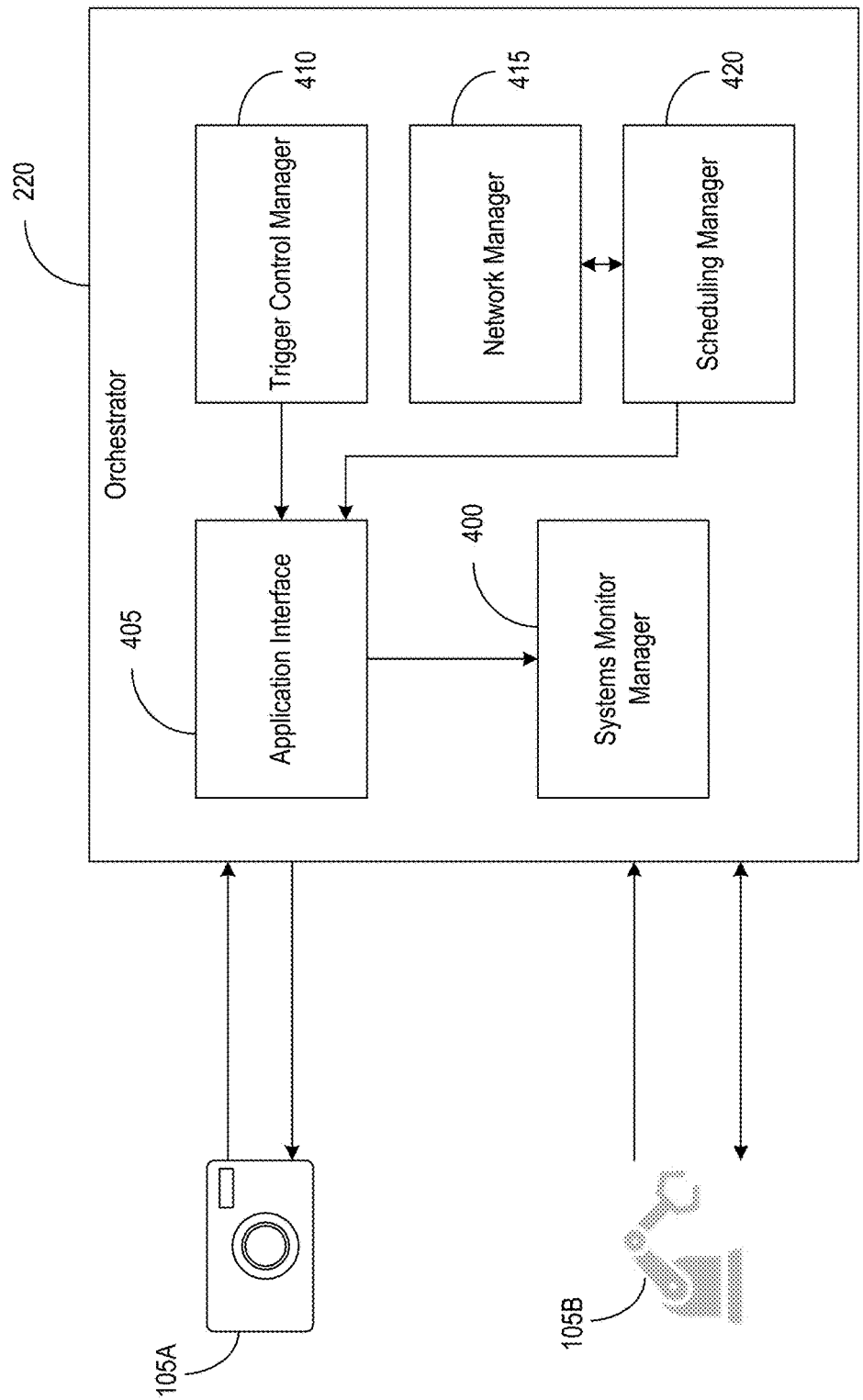
FIG. 4 is a block diagram of an orchestrator implemented by the server of FIG. 2 according to one example.

The orchestrator 220 is responsible for issuing different applications 225 to the devices 105. FIG. 4 is a block diagram of the orchestrator 220 in more detail. The orchestrator 220 communicates via the server 110 with the first device 105A and the second device 105B. For example, the devices 105 transmit application requests to the orchestrator 220 and transmit monitoring info (e.g., data gathered from the sensor 330) to the orchestrator 220. The orchestrator 220 transmits control messages to the devices 105, which may include new applications 225 to be implemented by the respective device 105.

The orchestrator 220 includes a systems monitor manager 400, an application interface 405, a trigger control manager 410, a network manager 415, and a scheduling manager 420. The systems monitor manager 400 records the state of all deployed modules (for example, which application 225 is deployed to which device 105 and how long the application 225 has been deployed). The systems monitor manager 400 may also monitor trigger-relevant system parameters related to trigger events and tracks resources available to the devices 105. Trigger events are events that, when detected by the orchestrator 220, cause the orchestrator 220 to transmit a new application 225 to a device 105.

The application interface 405 handles requests from the devices 105 for a new application 225 and for dispatching said applications 225. Additionally, the application interface 405 updates an orchestration state of the orchestrator 220 based on monitoring info. The orchestration state is, for example, a collective state of all of the devices 105 connected over the network 115. In some instances, the orchestration state indicates on which devices 105 the application 225 is deployed, how much compute and memory is available on each device 105, the available bandwidth on each connection within the network 115, and the like. The orchestrator 220 may refer to the orchestration state to determine whether to issue the new application 225. The orchestration state may be stored in the first memory 205.

The trigger control manager 410 tracks changes in state of the devices 105 to detect trigger events. When trigger events are detected, the trigger control manager 410 identifies an appropriate application 225 and transmits the application 225 to the respective device 105.

The network manager 415 monitors the state of devices 105 connected over the communication network 115. Additionally, the network manager 415 ensures that transmission of applications 225 to devices 105 by persisting messages until receiving an acknowledgement from devices 105. The scheduling manager 420 makes decisions on deployment of applications 225 based on predefined instructions.

As previously mentioned, the orchestrator 220, implemented by the server 110, transmits applications 225 to the devices 105. In this manner, the devices 105 may perform operations that are different than their original intent. For example, devices 105 may, by default, have an application 225 that provides instructions for facilitating standard operations of the device 105. However, the orchestrator 220 may transmit, for example, an anomaly detection application containing instructions for detecting anomalies in the operation of the device 105. The anomaly detection application replaces (e.g., overwrites) the default application 225 within the second memory 305 of the device 105. When anomaly detection is complete, the orchestrator 220 then transmits the default application 225 to the device 105 such that the device 105 resumes normal operation.

Figure 5:
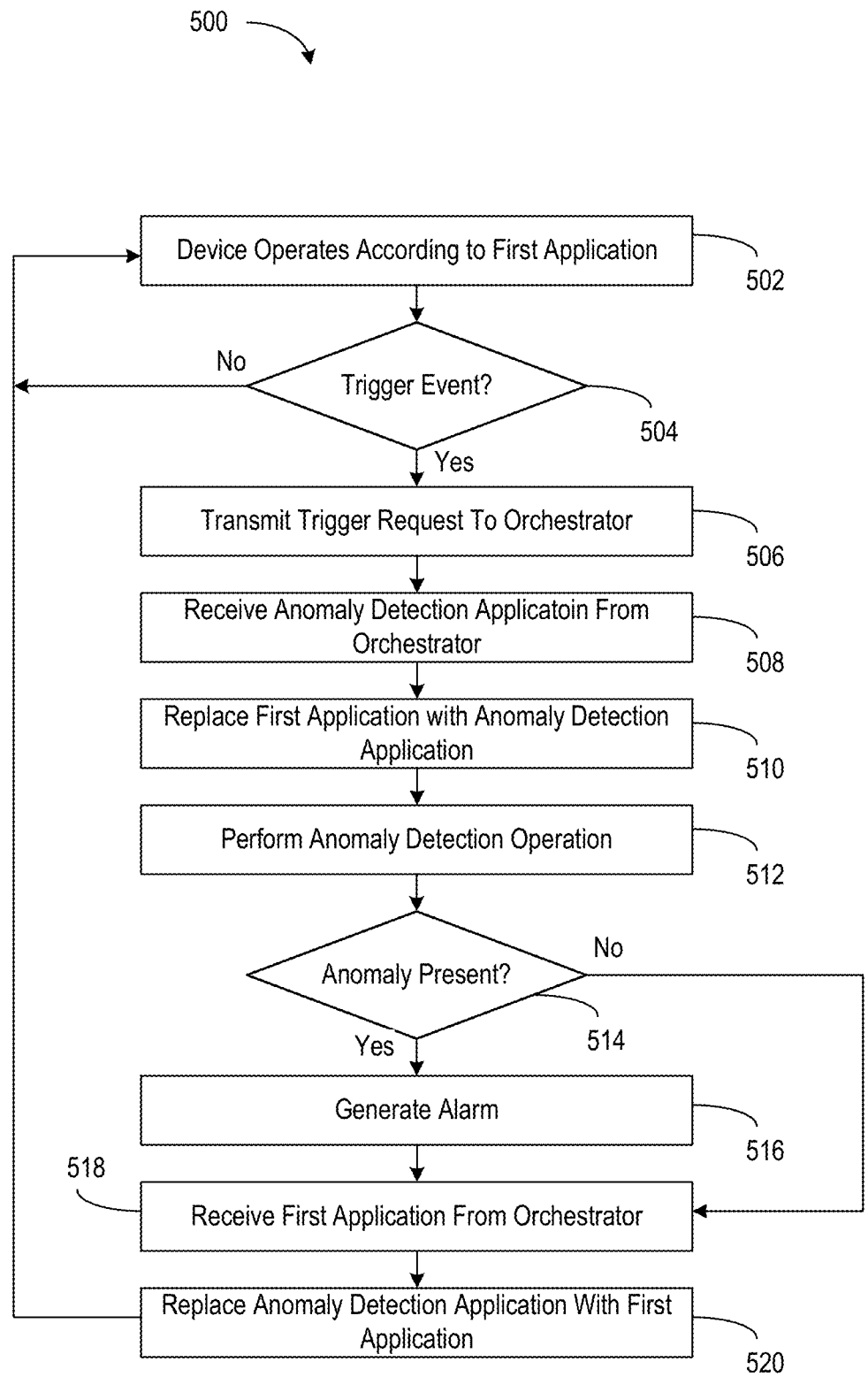
FIG. 5 is a flow chart of a method for implementing anomaly detection on embedded system devices according to one example.

FIG. 5 illustrates an example flowchart of a method 500 for anomaly detection of embedded systems. The method 500 is described as being executed by the second electronic processor 300. However, in some examples, aspects of the method 500 are performed by another computing device. for example, the method 500 may be performed by the second electronic processor 300 in conjunction with the first electronic processor 200. Additionally, while a particular order is provided, in some examples, the steps of the method 500 may be performed in a different order.

Figure 6A:
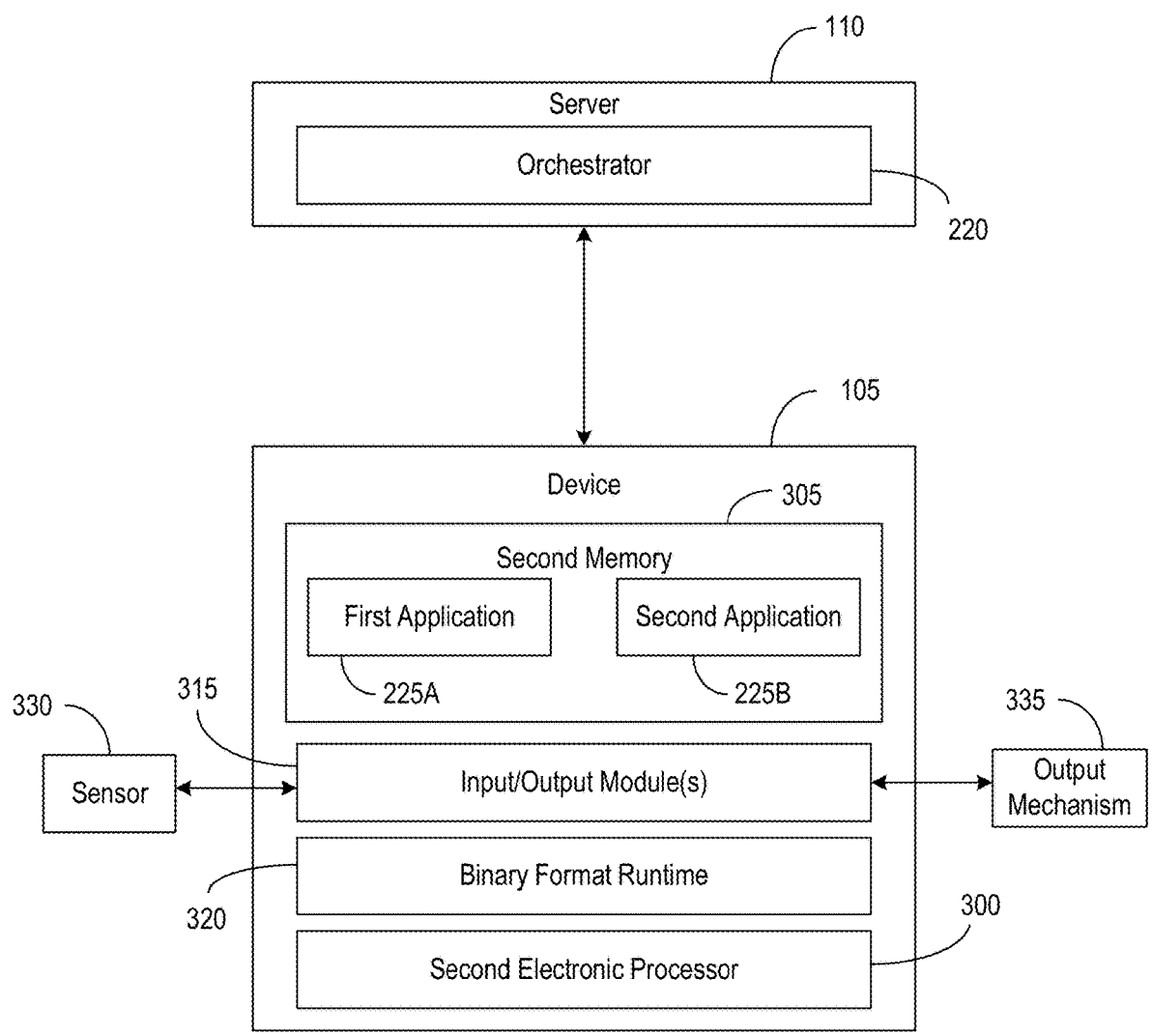
FIG. 6A is a block diagram of the embedded system device of FIG. 3 including applications according to one example.

At step 502, the second electronic processor 300 operates the device 105 according to a first application 225. For example, with respect to FIG. 6A, the second memory 305 of the device 105 stores a first application 225A and a second application 225B. The first application 225A and the second application 225B provide instructions to the second electronic processor 300 for normal operation of the device 105.

At step 504, the second electronic processor 300 determines whether a trigger event is occurring. Trigger events are events detected by the second electronic processor 300 and/or the first electronic processor 200 that may initiate an anomaly detection operation. Trigger events may include, as some examples, periods of low utilization of the device 105, the entering of a sleep mode by the device 105, the initiation of a maintenance check of the device 105, or the like. In some instances, the second electronic processor 300 analyzes sensor data from the sensor 330 to identify abnormal data from the sensor 330. When a value from the sensor 330 satisfies a threshold, the second electronic processor 300 detects a trigger event. In some implementations, the sensor data is provided to a machine learning model that analyzes the sensor data to detect a trigger event. As one example, the sensor 330 is a microphone adjacent to a motor. The electronic processor 300 analyzes sound associated with the motor that are detected by the sensor 330. When the sounds are abnormal compared to sounds created during normal operation of the motor, the electronic processor 300 may determine a trigger event is occurring.

When the second electronic processor 300 determines a trigger event is not occurring ("No" at step 504), the second electronic processor 300 returns to step 502. When the second electronic processor 300 determines a trigger event is occurring ("Yes" at step 504), the second electronic processor 300 proceeds to step 506.

At step 506, the second electronic processor 300 transmits a trigger request to the orchestrator 220. For example, the second electronic processor 300 transmits an indication of the trigger event to the orchestrator 220. At step 508, the second electronic processor 300 receives an anomaly detection application 605 (see FIG. 6B) from the orchestrator 220. The anomaly detection application 605 includes a set of instructions that, when implemented by the bytecode format runtime 320, perform an anomaly detection operation.

Figure 6B:
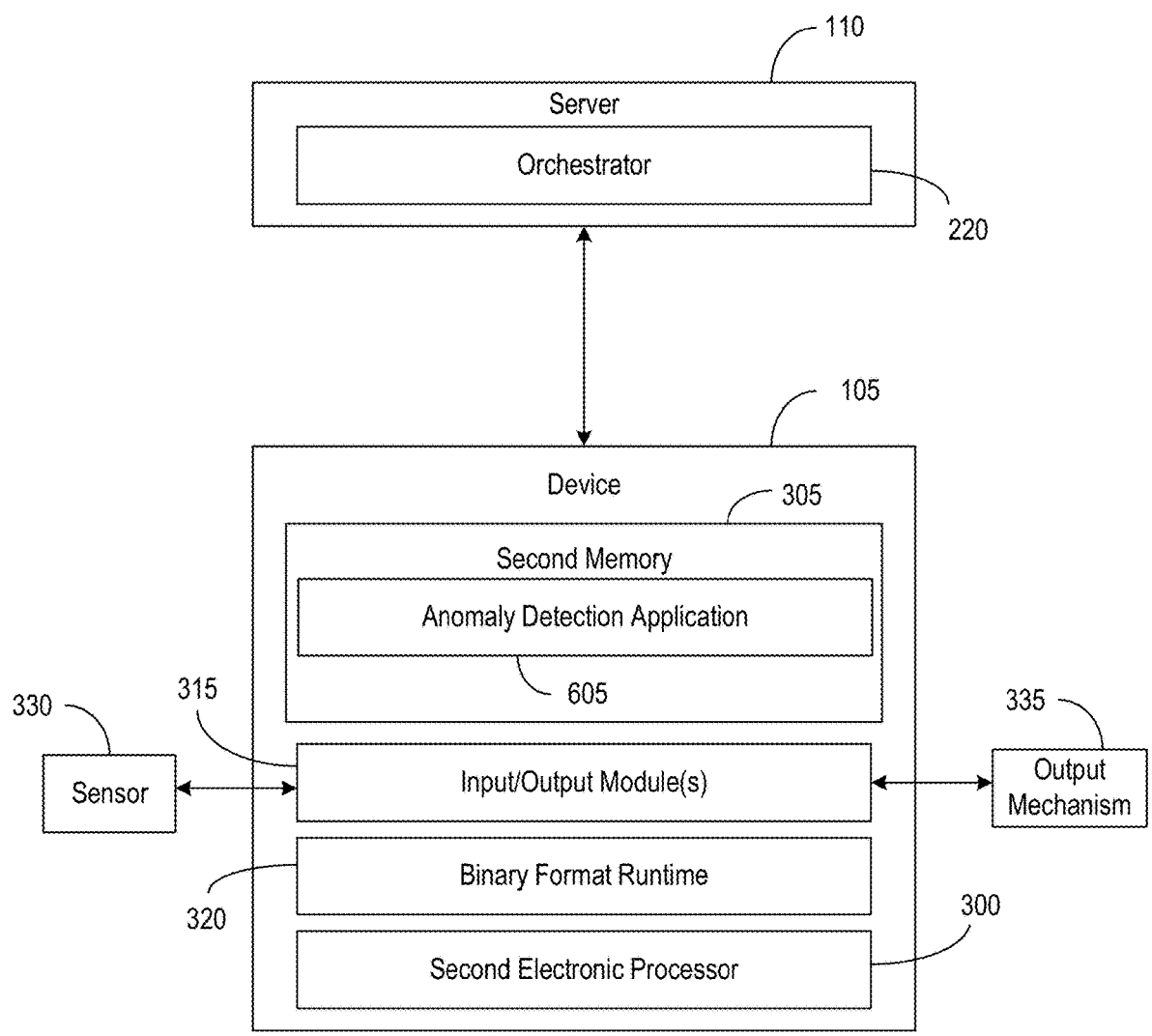
FIG. 6B is a block diagram of the embedded system device of FIG. 3 including an anomaly detection application according to one example.

At step 510, the second electronic processor 300 replaces the application 225 with the anomaly detection application 605. For example, as shown in FIG. 6B, the first application 225A and the second application 225B are replaced with the anomaly detection application 605 in the second memory 305. In this manner, the first application 225A and the second application 225B are removed from the second memory 305. In some instances, only one of the applications 225 may be replaced. For example, the first application 225A is replaced with the anomaly detection application 605 while the second application 225B is maintained. At step 512, the second electronic processor 300 performs an anomaly detection operation. For example, the second electronic processor 300 uses the bytecode format runtime 320 to implement the anomaly detection application 605.

At step 514, the second electronic processor 300 determines, based on the results of the anomaly detection operation, whether an anomaly is present in the operation of the device 105. When an anomaly is present ("Yes" at step 514), the second electronic processor 300 proceeds to step 516. When an anomaly is not present ("No" at step 514), the second electronic processor 300 skips to step 518. In some instances, the anomaly is an operating error or malfunction of the device 105.

At step 516, the second electronic processor 300 generates an alarm indicative of the anomaly. In some instances, the second electronic processor 300 controls the output mechanism 335 to provide an indication of the anomaly (for example, controls a light emitting diode to output a light, controls a display to provide an error screen, or the like). In some instances, the second electronic processor 300 shuts down operation of the device 105 in response to the anomaly. In some instances, the second electronic processor 300 transmits a signal to the server 110 indicating the anomaly.

At step 518, the second electronic processor 300 receives the application 225 from the server 110. At step 520, the second electronic processor 300 replaces the anomaly detection application 605 with the application 225.

Figure 7:
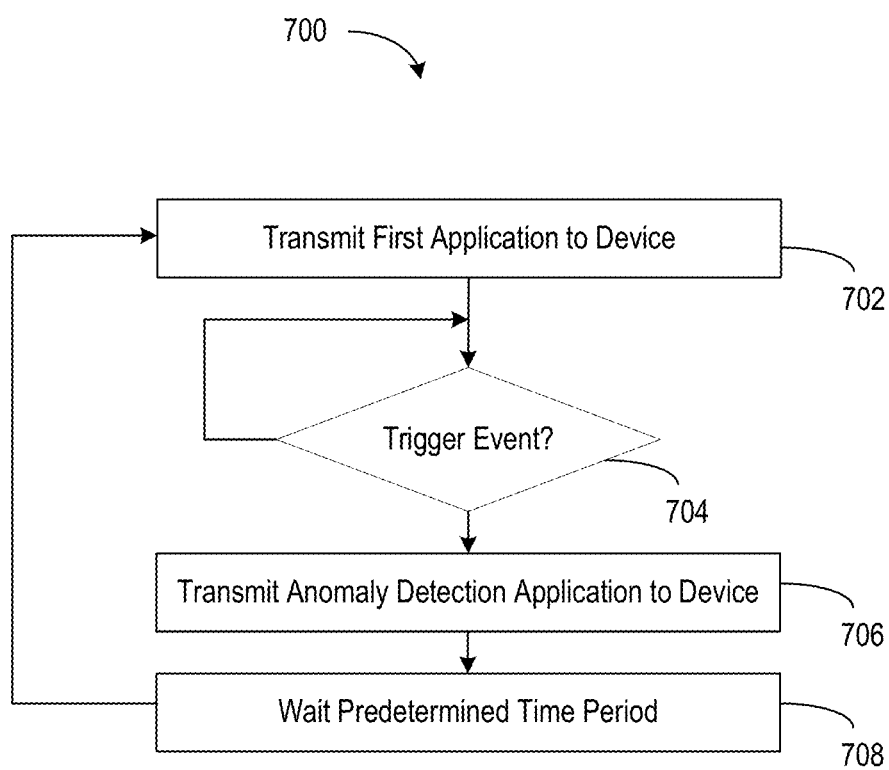
FIG. 7. is a flow chart of a method for transmitting anomaly detection applications to embedded system devices according to one example.

FIG. 7 illustrates an example flowchart of a method 700 for transmitting anomaly detection applications to embedded systems. The method 700 is described as being executed by the first electronic processor 200. However, in some examples, aspects of the method 700 are performed by another computing device. For example, the method 700 may be performed by the first electronic processor 200 in conjunction with the second electronic processor 300. Additionally, while a particular order is provided, in some examples, the steps of the method 700 may be performed in a different order.

At step 702, the first electronic processor 200 transmits an application 225 to the device 105. For example, the first electronic processor 200 transmits the first application 225A and the second application 225B to the device 105 such that the device 105 performs normal operation.

At step 704, the first electronic processor 200 monitors for a trigger event. When a trigger event is detected ("Yes" at step 704), the first electronic processor 200 proceeds to step 706. When a trigger event is not detected ("No" at step 704), the first electronic processor 200 continues to monitor for a trigger event.

At step 706, the first electronic processor 200 transmits the anomaly detection application 605 to the device 105. At step 708, the first electronic processor 200 waits a predetermined time period (e.g., a predetermined amount of time). After the predetermined time period is satisfied, the first electronic processor 200 returns to step 702 and transmits the application 225 to the device 105. In some instances, rather than waiting a predetermined time period, the first electronic processor 200 receives an indication from the device 105 that the anomaly detection operation is complete. In response, the first electronic processor 200 transmits the application 225.

Thus, examples provide, among other things, systems and methods for anomaly detection in embedded systems. Various features, advantages, and examples are set forth in the following claims.

What is claimed is:

1. An anomaly detection system comprising:
   a computer including an electronic processor and a memory, the memory storing a first application, wherein the first application includes a first set of instructions that facilitate standard operations for the computer, wherein the electronic processor is configured to:
   transmit a request to a server requesting an anomaly detection application, wherein the anomaly detection application includes a second set of instructions for detecting anomalies of the device,
   receive, from the server, the anomaly detection application,
   replace the first application with the anomaly detection application within the memory,
   detect, while implementing the anomaly detection application, an operating error, and
   transmit, in response to the operating error, an indication of the operating error to the server.

2. The anomaly detection system of claim 1, wherein the electronic processor is further configured to:
   shut down, in response to the operating error, operation of the computer.

3. The anomaly detection system of claim 1, wherein the electronic processor is further configured to:
   control an output mechanism of the computer to provide the indication of the operating error.

4. The anomaly detection system of claim 1, wherein the electronic processor is configured to transmit the request for the anomaly detection application in response to a trigger event.

5. The anomaly detection system of claim 4, wherein the trigger event is based on utilization of the computer.

6. The anomaly detection system of claim 4, wherein the computer further includes a sensor, and wherein the electronic processor is configured to detect the trigger event is based on abnormal data from the sensor.

7. The anomaly detection system of claim 6, wherein the sensor is a microphone configured to detect sounds associated with a motor, and wherein the electronic processor is configured to detect the trigger event based on the sounds detected by the microphone.

8. The anomaly detection system of claim 1, wherein the electronic processor is further configured to:
   receive, from the server and a predetermined amount of time after receiving the anomaly detection application, the first application, and
   replace the anomaly detection application with the first application within the memory.

9. The anomaly detection system of claim 1, wherein the electronic processor is further configured to:
   transmit, after performing an anomaly detection operation using the anomaly detection application, a request for the first application to the server,
   receive, from the server, the first application, and
   replace the anomaly detection application with the first application within the memory.

10. The anomaly detection system of claim 1, wherein the first application and the anomaly detection application are bytecode instruction modules, and wherein the electronic processor implements a bytecode instruction format runtime to implement the first application and the anomaly detection application.

11. A method for anomaly detection in embedded systems, the method comprising:
    transmitting, via an electronic processor of a computer, a request requesting an anomaly detection application to an orchestrator stored in a server, wherein the anomaly detection application includes a first set of instructions for detecting anomalies of the computer,
    receiving, via the electronic processor and from the server, the anomaly detection application,
    replacing, via the electronic processor, a first application stored in a memory with the anomaly detection application, wherein the first application includes a second set of instructions that facilitate standard operations for the computer,
    performing, via the electronic processor implementing the anomaly detection application, an anomaly detection operation,
    detecting, via the electronic processor and while implementing the anomaly detection application, an operating error, and
    transmitting, via the electronic processor and in response to the operating error, an indication of the operating error to the server.

12. The method of claim 11, further comprising:
    shutting down, via the electronic processor and in response to the operating error, operation of the computer.

13. The method of claim 11, further comprising:
    controlling, via the electronic processor, an output mechanism of the computer to provide the indication of the operating error.

14. The method of claim 11, further comprising:
    transmitting the request for the anomaly detection application in response to a trigger event.

15. The method of claim 14, wherein the trigger event is based on utilization of the computer.

16. The method of claim 11, further comprising:
receiving, via the electronic processor and a predetermined amount of time after receiving the anomaly detection application, the first application from the server, and
replacing the anomaly detection application with the first application within the memory.

17. The method of claim 11, further comprising:
transmitting, via the electronic processor and after performing the anomaly detection operation using the anomaly detection application, a request for the first application to the server,
receiving, via the electronic processor, the first application from the server, and
replacing the anomaly detection application with the first application within the memory.

\* \* \* \* \*